US012157680B2

(12) United States Patent
Wei et al.

(10) Patent No.: US 12,157,680 B2
(45) Date of Patent: Dec. 3, 2024

(54) HOUSEHOLD WATER PURIFIER

(71) Applicant: YUNDA H&H TECH (Tianjin) CO., LTD., Tianjin (CN)

(72) Inventors: Enyu Wei, Tianjin (CN); Yinping Yuan, Tianjin (CN); Hao Xu, Tianjin (CN); Xu Yang, Tianjin (CN)

(73) Assignee: YUNDA H&H TECH (TIANJIN) CO., LTD., Tianjin (CN)

( * ) Notice: Subject to any disclaimer, the term of this patent is extended or adjusted under 35 U.S.C. 154(b) by 87 days.

(21) Appl. No.: 17/557,160

(22) Filed: Dec. 21, 2021

(65) Prior Publication Data
US 2023/0138998 A1 May 4, 2023

(30) Foreign Application Priority Data
Nov. 3, 2021 (CN) .......................... 202111295553.0

(51) Int. Cl.
*C02F 1/00* (2023.01)
*B01D 61/08* (2006.01)
*C02F 1/44* (2023.01)

(52) U.S. Cl.
CPC ............ *C02F 1/003* (2013.01); *B01D 61/081* (2022.08); *C02F 1/441* (2013.01);
(Continued)

(58) Field of Classification Search
CPC ...... C02F 1/003; C02F 1/441; C02F 2301/08; C02F 2307/02; C02F 1/283;
(Continued)

(56) References Cited

U.S. PATENT DOCUMENTS

2004/0104157 A1 6/2004 Beeman et al.
2017/0282105 A1* 10/2017 You .......................... F25D 23/12
2020/0282346 A1 9/2020 Meza

FOREIGN PATENT DOCUMENTS

CN 102557287 A * 7/2012 .............. C02F 1/441
CN 202705130 U 1/2013
(Continued)

OTHER PUBLICATIONS

Windsor, Backflow Prevention, pp. 1-9, 2014 (Year: 2014).*
(Continued)

*Primary Examiner* — Patrick Orme
(74) *Attorney, Agent, or Firm* — Shih IP Law Group, PLLC

(57) ABSTRACT

A household water purifier includes a main unit and a filter assembly arranged in the main unit. The filter assembly includes a composite filter core. The composite filter core includes a filter bottle and a filter element located in the filter bottle. The filter element is of a separated structure. In the household water purifier, the filter element is located in the filer bottle; during use, when the filter element needs to be replaced, the filter element can be directly taken out of the filter bottle for replacement; Furthermore, the filter element itself is of a split structure There is no need to replace the filter element as a whole, just some failed components of the filter element need to be replaced, which further improves convenience of replacement and maintenance of the filter core of the water purifier, and saves maintenance and use costs of the water purifier.

6 Claims, 8 Drawing Sheets

(52) U.S. Cl.
CPC .... *B01D 2313/903* (2022.08); *C02F 2301/08* (2013.01); *C02F 2307/02* (2013.01)

(58) Field of Classification Search
CPC .......... C02F 2201/003; C02F 2201/006; C02F 2307/10; C02F 9/00; C02F 9/20; B01D 27/148; B01D 61/04; B01D 61/08; B01D 61/081; B01D 63/06; B01D 2311/2626; B01D 2311/2649; B01D 2313/243; B01D 2313/90; B01D 2313/903
See application file for complete search history.

(56) References Cited

FOREIGN PATENT DOCUMENTS

| CN | 203269679 U | | 11/2013 | |
|---|---|---|---|---|
| CN | 103755051 A | | 4/2014 | |
| CN | 203904091 U | * | 10/2014 | |
| CN | 205204849 U | | 5/2016 | |
| CN | 105780853 A | * | 7/2016 | ......... B01D 46/0023 |
| CN | 107915280 A | * | 4/2018 | ................ C02F 1/02 |
| CN | 110422911 A | * | 11/2019 | |
| CN | 110723833 A | * | 1/2020 | ................ C02F 9/00 |
| CN | 213569772 U | | 6/2021 | |
| WO | WO-2014077414 A1 | * | 5/2014 | ............ B01D 61/10 |

OTHER PUBLICATIONS

Weng, CN203904091 U, English machine translation (Year: 2014).*
Su, CN110422911 A, English machine translation (Year: 2019).*
Zhang, CN110723833 A, English machine translation (Year: 2020).*
Cai, CN102557287 A, English machine translation (Year: 2012).*
Kawakami, WO2014077414 A1, English machine translation (Year: 2014).*
Ping, CN105780853 A, English machine translation (Year: 2016).*
Liang, CN107915280 A, English machine translation (Year: 2018).*
Reverse Osmosis, How Reverse Osmosis Booster Pumps Work (Year: 2020).*
CN Office Action from CN Application No. 202111295553.0 mailed Jul. 5, 2024, 9 pages.
Extended European Search Report from EP Application No. 21216154.1 mailed Jun. 7, 2022, 8 pages.

* cited by examiner

HOUSEHOLD WATER PURIFIER

CROSS REFERENCE TO RELATED APPLICATION

This application claims the priority of Chinese Patent Application No. 202111295553.0, entitled "HOUSEHOLD WATER PURIFIER" filed with the Chinese Patent National Intellectual Property Administration on Nov. 3, 2021, which is incorporated herein by reference in its entirety.

TECHNICAL FIELD

The present disclosure relates to the technical field of water treatment equipment and its surrounding supporting facilities, in particular to a household water purifier.

BACKGROUND ART

At present, most household water purifiers on the market are reverse osmosis water purifiers. The working principle of reverse osmosis: the reverse osmosis is the most precise membrane liquid separation technology. An operating pressure is applied on the inlet water (concentrated solution) side to overcome natural osmotic pressure. When the operating pressure higher than the natural osmotic pressure is applied to the concentrated solution side, a flow direction of the water molecules permeating naturally, will be reversed, and the water molecules in the inlet water (concentrated solution) will partially pass through the reverse osmosis membrane to become the purified water on the dilute solution side. The reverse osmosis equipment can block all soluble salts and organic matter with a molecular weight greater than 100, but allows the water molecules to pass through to achieve purpose of purifying water.

The reverse osmosis water purifiers can be used in two modes, one mode is an electric drive reverse osmosis water purifier, and the other is a non-electric drive reverse osmosis water purifier. The electric drive reverse osmosis purifier is powered by an external power, and the electric energy drives operation of the water purifier. The electric energy provides power for the booster pump in the water purifier. The booster pump pressurizes the water to achieve an optimum water pressure required by reverse osmosis membrane. The non-electric reverse osmosis water purifier has no power input. The purification of the reverse osmosis membrane mainly depends on the water pressure of the tap water. The water molecules pass through the reverse osmosis membrane via the water pressure of the tap water, and other substances are intercepted to achieve the purpose of purifying water.

In the reverse osmosis water purifiers used in homes, the electric drive water purifiers are widely used, and have low requirements on water pressure of the raw water. There are even electric self-priming reverse osmosis water purifiers, with no requirements on water pressure of the raw water. The non-electric drive reverse osmosis water purifier has higher requirements on the water pressure of the raw water, the water pressure of the raw water is required to reach 0.2 MPa or above, and the use effect of the non-electric drive water purifier is slightly worse than that of the electric drive water purifier. However, the non-electric drive reverse osmosis water purifier has the advantages of no electronic components inside, low price, simple structure and small size. The non-electric drive reverse osmosis water purifier is especially suitable for families with no power interface under cabinets in some old communities. However, there are currently no machines on the market that have the advantages of these two reverse osmosis water purifiers at the same time, and users can only choose one according to their actual situation.

At present, there are some composite filter cores on the market, but they are only a simple combination of coarse filtration, and their functions are relatively single. Furthermore, most of the filter cores are replaced in a disposable mode. When a filter core at a certain stage reaches its service life, the entire filter core must be disposed. Even some water purifiers integrate the composite filter core and the filter bottle into one-piece, the composite filter core and the filter bottle cannot be disassembled. When replacing the filter core, the filter core and the filter bottle need to be replaced together, which causes great waste and increases user's maintenance cost.

Therefore, how to improve current situation in the prior art, such as higher maintenance and use costs of the household water purifier caused by that the household water purifier needs to be replaced as a whole, has become an urgent problem to be solved by those skilled in the art.

SUMMARY

The purpose of the present embodiment is to provide a household water purifier to solve the above-mentioned problems in the prior art, reduce replacement and maintenance costs of the filter core of the water purifier, and save use costs of the water purifier.

In order to achieve the above purposes, it is provided a household water purifier, including a main unit and a filter assembly arranged in the main unit. The filter assembly includes a composite filter core.

The composite filter core includes a filter bottle and a filter element. The filter element is arranged in the filter bottle, and the filter element is of a separated structure.

In some embodiments, the household water purifier further includes an expansion unit detachably connected to the main unit. The expansion unit includes a booster pump for pressurizing a water path.

In some embodiments, the filter element includes a Polypropylene (PP) melt-blown filter layer, a sintered activated carbon rod and a reverse osmosis membrane. The PP melt-blown filter layer is sleeved on the sintered activated carbon rod, a first gap formed between the PP melt-blown filter layer and the filter bottle is configured as a water inlet channel, and the sintered activated carbon rod is sleeved on the reverse osmosis membrane, and a second gap formed between the sintered activated carbon rod and the reverse osmosis membrane is configured as a water flow channel; the reverse osmosis membrane is hollow and cylindrical, a hollow portion of the reverse osmosis membrane is configured as a purified water channel.

In some embodiments, the filter element further includes an upper end cover and a lower end cover, the PP melt-blown filter layer and the sintered activated carbon rod are connected with the upper end cover and the lower end cover. The upper end cover and the lower end cover each have a groove capable of fixing the reverse osmosis membrane, and the upper end cover further has a plug-in portion fitted with the reverse osmosis membrane. The water inlet channel, the water flow channel and the purified water channel are provided with sealing rings, respectively.

In some embodiments, the composite filter core further includes an upper cover, and the upper cover is detachably connected to the filter bottle.

In some embodiments, the filter assembly further includes a rear filter core, and a purified water outlet of the composite filter core is in communication with the rear filter core.

In some embodiments, a plurality of rear filter cores are provided, and arranged in series.

In some embodiments, when the main unit is connected to the expansion unit, the expansion unit is arranged between the PP melt-blown filter layer and the sintered activated carbon rod. The expansion unit further includes a low pressure switch and a water inlet solenoid valve; the low pressure switch and the water inlet solenoid valve are connected with the booster pump, the low pressure switch is arranged close to the PP melt-blown filter layer. The booster pump is arranged close to the sintered activated carbon rod; the water inlet solenoid valve is located between the low pressure switch and the booster pump; the reverse osmosis membrane is connected with a concentrated water solenoid valve.

In some embodiments, the main unit further includes a four-side valve arranged between a faucet and the filter assembly, and a check valve is arranged between a water outlet of the filter assembly and the four-side valve.

In some embodiments, the main unit includes a reserved connector and a pipe plug, and the pipe plug is detachably connected to the reserved connector; the expansion unit comprises a switching plug fitted into the reserved connector. When the main unit is connected to the expansion unit, the reserved connector is connected to the switching plug; sealing elements are arranged between the reserved connector and the pipe plug as well as between the reserved connector and the switching plug, respectively.

Compared with the prior art, the present embodiment has achieved the following technical effects. The household water purifier of the present embodiment includes the main unit and the filter assembly arranged in the main unit. The filter assembly includes the composite filter core. The composite filter core includes a filter bottle and a filter element. The filter element is arranged in the filter bottle, and the filter element is of a split structure.

In the household water purifier of the present embodiment, the filter element is located in the filter bottle. During use, when the filter element needs to be replaced, the filter element can be directly taken out of the filter bottle for replacement; and the filter element itself is of a split structure, it is no necessary to replace the filter element as a whole, only some failed components of the filter element are replaced, which further improves convenience of replacement and maintenance of the filter core of the water purifier, and saves the maintenance cost and the us cost of the water purifier.

BRIEF DESCRIPTION OF THE DRAWINGS

In order to explain the embodiments of the present disclosure or the technical solutions in the prior art more clearly, the drawings in the embodiments will be described briefly below. Apparently, the drawings in the following description are only some embodiments of the present disclosure. Other drawings, for those of ordinary skill in the art, can be obtained based on these drawings, without creative efforts.

List of reference numbers: 1 main unit, 2 expansion unit, 3 filter assembly, 4 composite filter core, 5 filter bottle, 6 filter element, 7 PP melt-blown filter layer, 8 sintered activated carbon rod, 9 reverse osmosis membrane, 10 upper end cover, 11 lower end cover, 12 upper cover, 13 rear filter core, 14 booster pump, 15 low pressure switch, 16 water inlet solenoid valve, 17 concentrated water solenoid valve, 18 four-side valve, 19 check valve, 20 reserved connector, 21 pipe plug, 22 switching plug, 23 high pressure switch, 24 controller, and 25 faucet.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

The purpose of the present disclosure is to provide a household water purifier to solve the above-mentioned problems in the prior art, reduce costs of replacement and maintenance of the water purifier filter core, and save use-costs of the water purifier.

In order to make the above objectives, features and advantages of the present disclosure more obvious and understandable, the present disclosure will be further described in detail below with reference to the accompanying drawings and specific embodiments.

Figure 1:
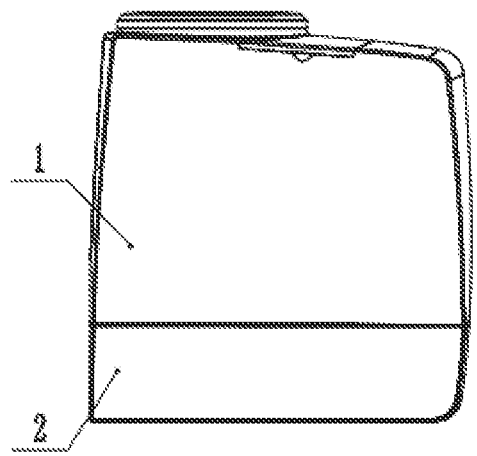
FIG. 1 is a schematic structural diagram of a household water purifier according to the present disclosure.
Figure 2:
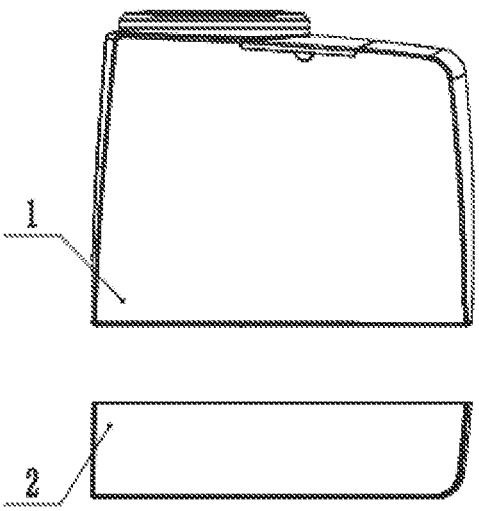
FIG. 2 is a schematic diagram of the household water purifier in a disassembled state according to the present disclosure.
Figure 3:
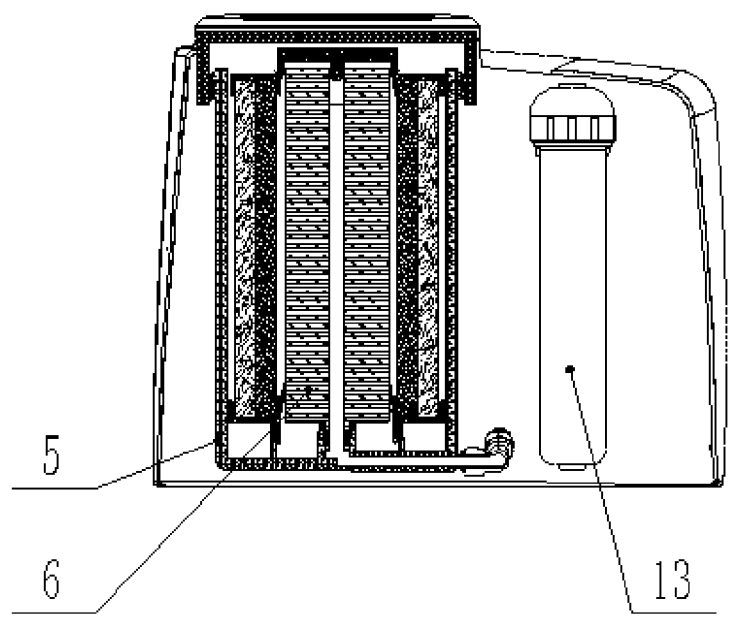
FIG. 3 is a schematic cross-section diagram of a main unit of the household water purifier according to the present disclosure.
Figure 4:
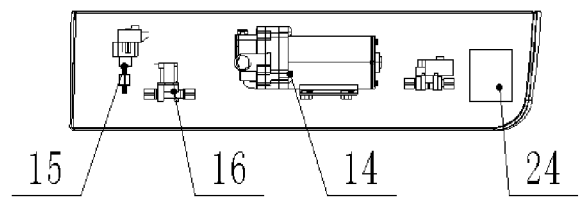
FIG. 4 is a schematic cross-section diagram of an expansion unit of the household water purifier according to the present disclosure.
Figure 5:
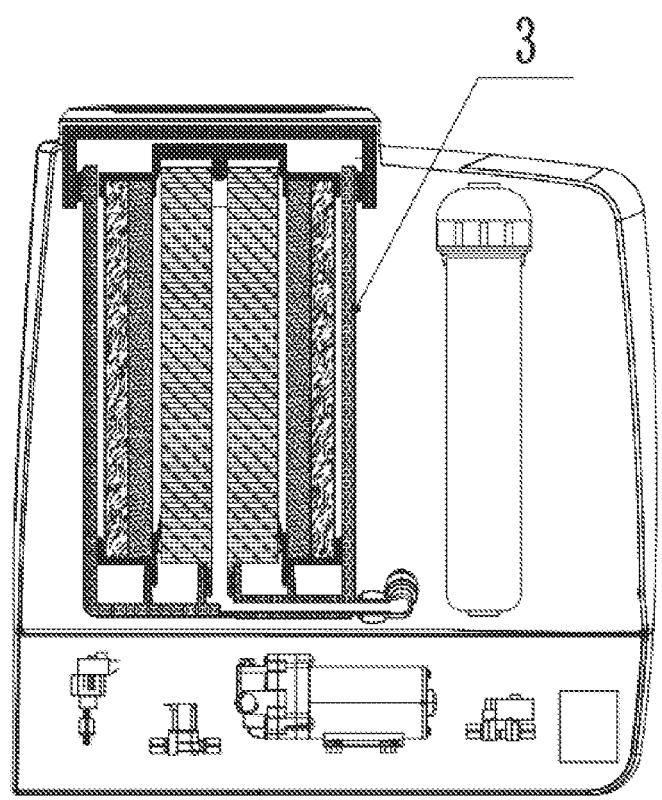
FIG. 5 is a schematic cross-section diagram of the household water purifier when the main unit and the expansion unit of the household water purifier are assembled, according to the present disclosure.
Figure 6:
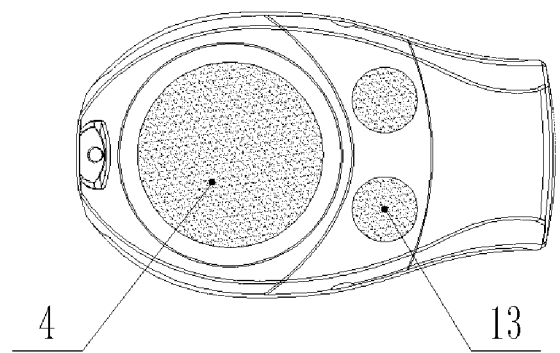
FIG. 6 is a top schematic cross-section diagram of the household water purifier according to the present disclosure.
Figure 7:
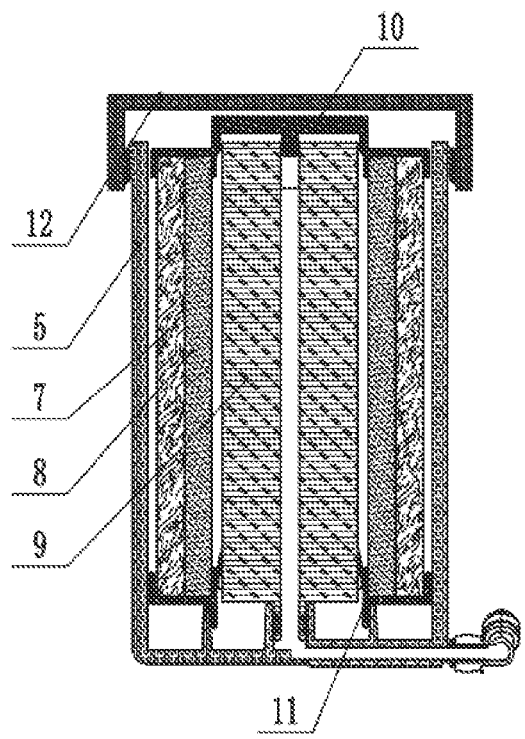
FIG. 7 is a schematic structural diagram of a composite filter core of the household water purifier according to the present disclosure.
Figure 8:
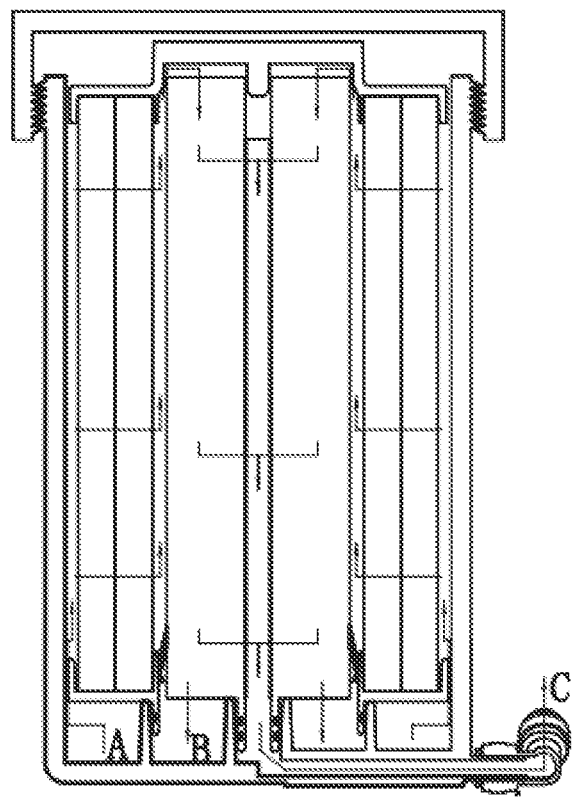
FIG. 8 is a schematic diagram showing a water flow path of the composite filter core of the household water purifier according to the present disclosure.
Figure 9:
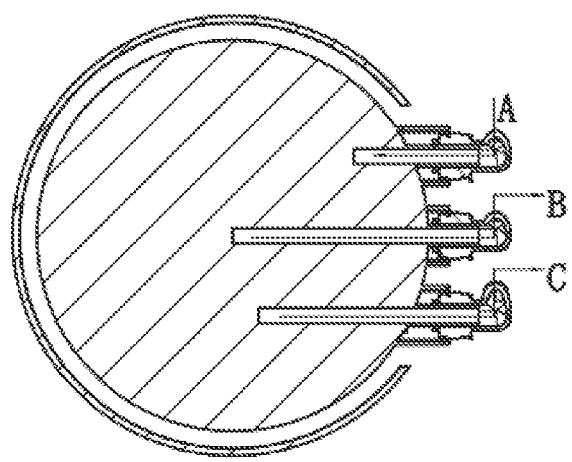
FIG. 9 is a schematic diagram showing a water flow path at a bottom of the composite filter core of the household water purifier according to the present disclosure.
Figure 10:
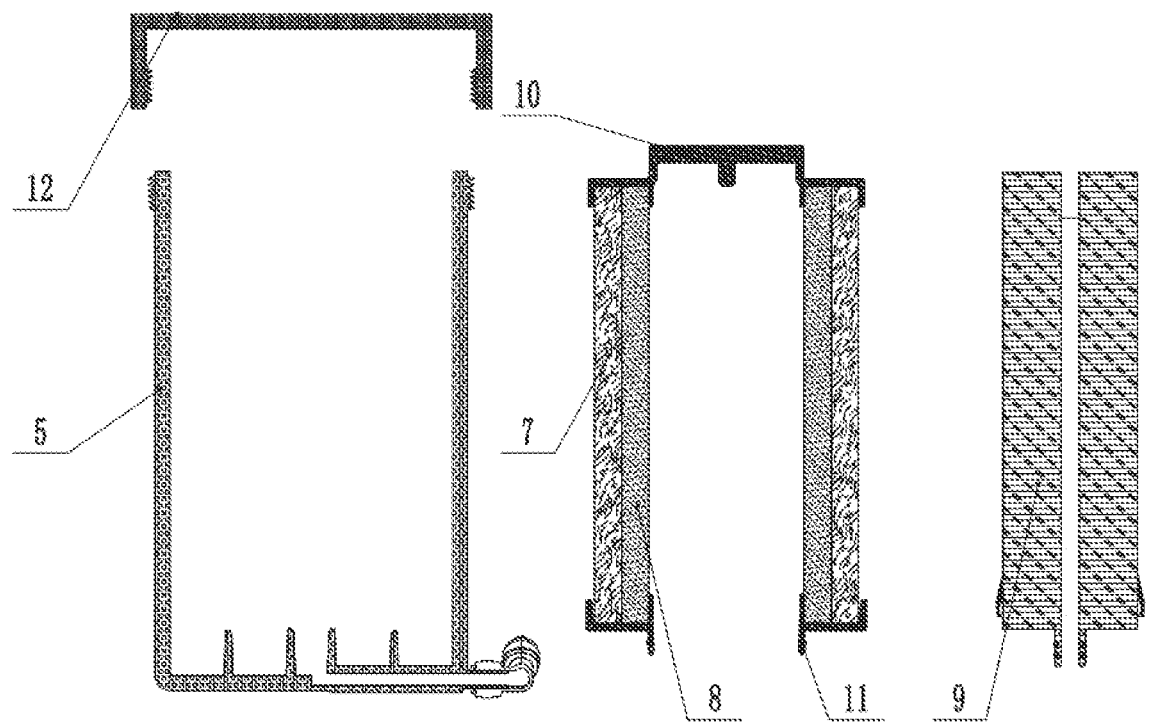
FIG. 10 is a schematic diagram of the composite filter core of the household water purifier in a disassembled state according to the present disclosure.
Figure 11:
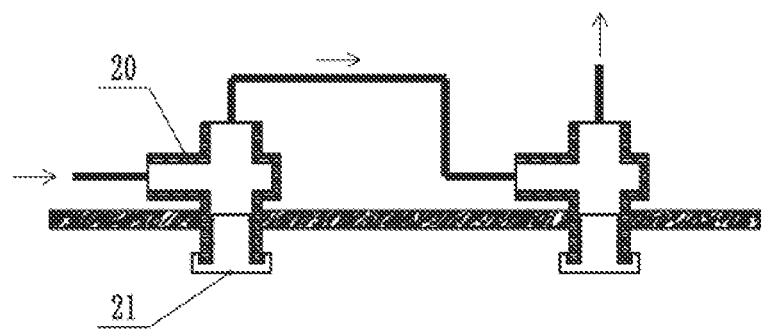
FIG. 11 is a partial structural schematic diagram of the main unit of the household water purifier according to the present disclosure.
Figure 12:
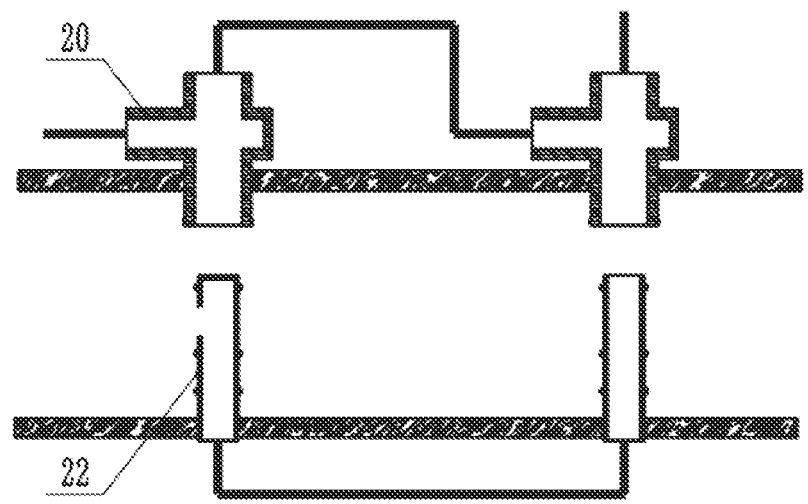
FIG. 12 is a partial structural schematic diagram of the household water purifier before the main unit and the expansion unit of the household water purifier are assembled, according to the present disclosure.
Figure 13:
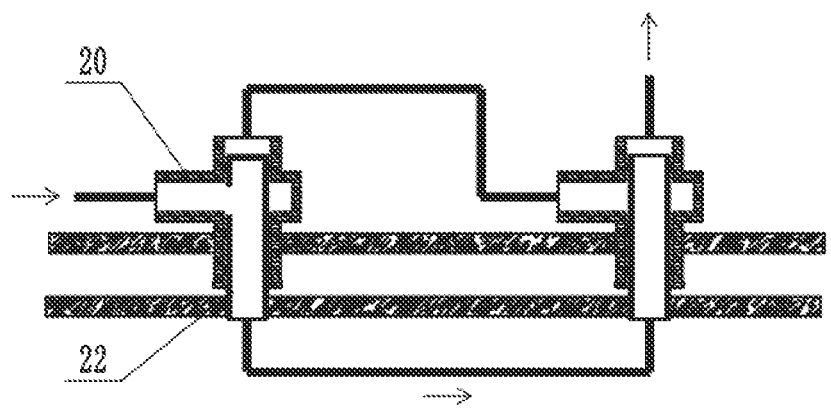
FIG. 13 is a partial structural schematic diagram of the household water purifier after the main unit and the expansion unit of the household water purifier are assembled, according to the present disclosure.
Figure 14:
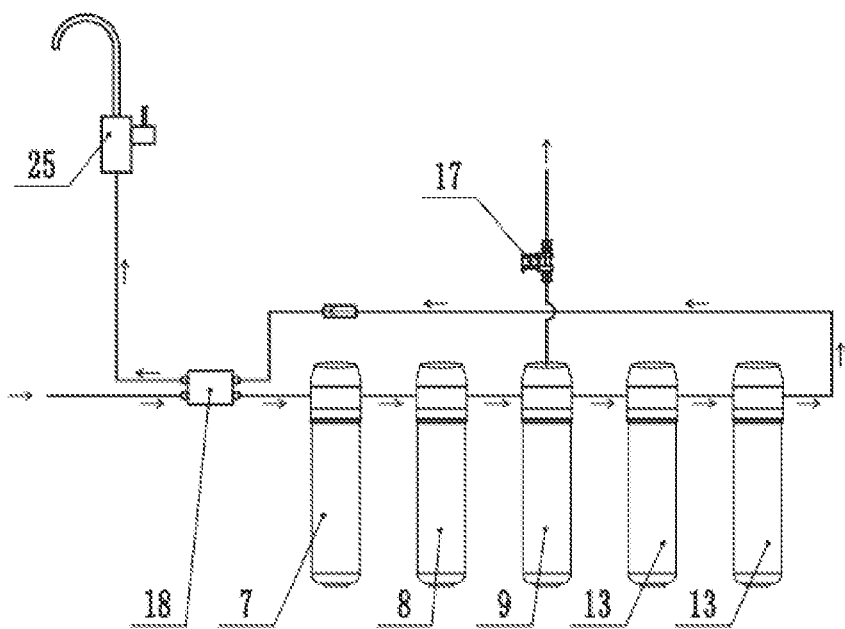
FIG. 14 is a working principle diagram of the main unit of the household water purifier according to the present disclosure.
Figure 15:
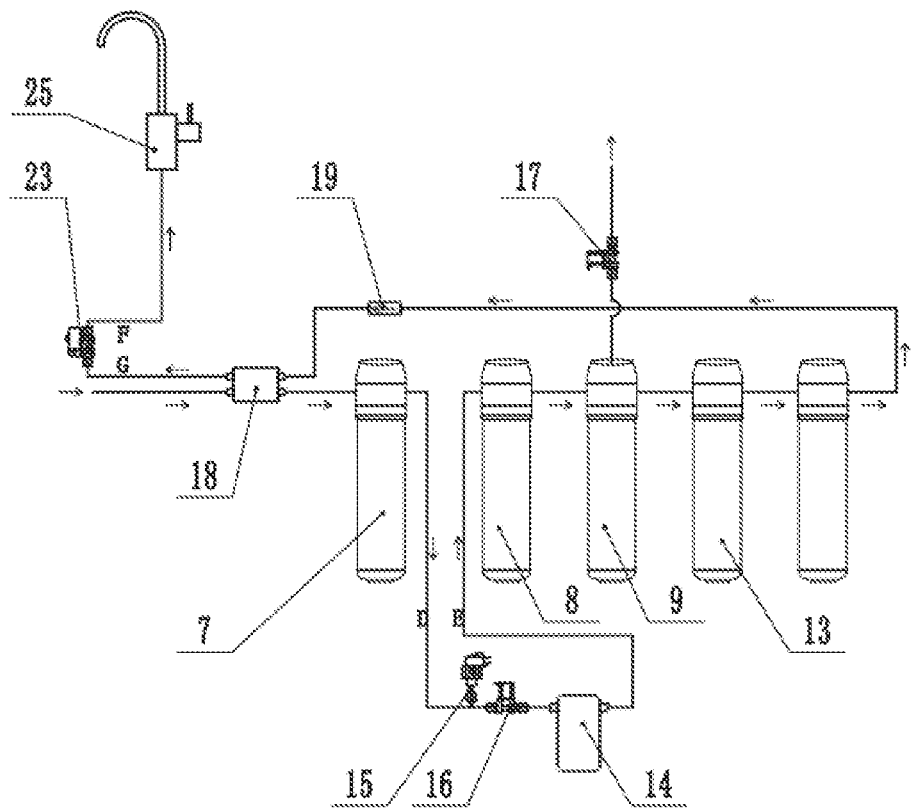
FIG. 15 is a working principle diagram of the household water purifier when the main unit and the expansion unit of the household water purifier are assembled, according to the present disclosure.

Referring to FIGS. 1-15, FIG. 1 is a schematic structural diagram of a household water purifier according to the present disclosure; FIG. 2 is a schematic diagram of the household water purifier in a disassembled state according to the present disclosure; FIG. 3 is a schematic cross-section diagram of a main unit of the household water purifier according to the present disclosure; FIG. 4 is a schematic cross-section diagram of an expansion unit of the household water purifier according to the present disclosure; FIG. 5 is a schematic cross-section diagram of the household water purifier when the main unit and the expansion unit of the household water purifier are assembled, according to the present disclosure; FIG. 6 is a top schematic cross-section diagram of the household water purifier according to the present disclosure; FIG. 7 is a schematic structural diagram of a composite filter core of the household water purifier according to the present disclosure; FIG. 8 is a schematic diagram showing a water flow path of the composite filter core of the household water purifier according to the present disclosure; FIG. 9 is a schematic diagram showing a water flow path at a bottom of the composite filter core of the household water purifier according to the present disclosure; FIG. 10 is a schematic diagram of the composite filter core of the household water purifier in a disassembled state according to the present disclosure; FIG. 11 is a partial structural schematic diagram of the main unit of the household water purifier according to the present disclosure; FIG. 12 is a partial structural schematic diagram of the household water purifier before the main unit and the expansion unit of the household water purifier are assembled, according to the present disclosure; FIG. 13 is a partial structural schematic diagram of the household water purifier after the main unit and the expansion unit of the household water purifier are assembled, according to the present disclosure; FIG. 14 is a working principle diagram of the main unit of the household water purifier according to the present disclosure; FIG. 15 is a working principle diagram of the household water purifier when the main unit and the expansion unit of the household water purifier are assembled, according to the present disclosure.

The present disclosure provides a household water purifier, including a main unit 1 and a filter assembly 3 arranged in the main unit 1. The filter assembly 3 includes a composite filter core 4. The composite filter core 4 includes a filter bottle 5 and a filter element 6, the filter element 6 is provided inside the filter bottle 5, and the filter element 6 is of split structure.

In the household water purifier of the present disclosure, the filter element 6 is located in the filter bottle 5. During use, when the filter element 6 needs to be replaced, the filter element 6 can be directly taken out of the filter bottle 5 for replacement. The filter element 6 is of split structure, it is not necessary for the filter element 6 to be replaced as a whole, and only partial failed structure are replaced, which further improves convenience of replacement and maintenance of the water purifier filter element, and saves maintenance costs and water purifier use costs.

It is noted that, the household water purifier of the present disclosure further includes an expansion unit 2 detachably connected to the main unit 1. The expansion unit 2 includes a booster pump 14 which may pressurize a water path. In the present disclosure, the main unit 1 may be used independently as a non-electric drive water purifier. The expansion unit 2 is provided together with the main unit 1. When the expansion unit 2 is connected to the main unit 1, the booster pump 14 can pressurize the water path to enable the water purifier to operate in an electric drive working mode, so that the water purifier can realize two working modes, thereby improving adaptability and convenience of the water purifier.

Specifically, the filter element 6 includes a PP melt-blown filter layer 7, a sintered activated carbon rod 8 and a reverse osmosis membrane 9. The PP melt-blown filter layer 7 is sleeved on the sintered activated carbon rod 8, and a gap formed between the PP melt-blown filter layer 7 and the filter bottle 5 is configured as a water inlet channel. The inlet water enters from the water inlet channel (direction A in FIG. 8), passes through the PP melt-blown filter layer 7 for preliminary filtration, and then passes through the sintered activated carbon rod 8 for adsorption filtration, and the sintered activated carbon rod 8 is sleeved on the reverse osmosis membrane 9, and a gap formed between the sintered activated carbon rod 8 and the reverse osmosis membrane 9 is configured as a water flow channel. The water flow that has been adsorbed and filtered by the sintered activated carbon rod 8 is deeply filtered by the reverse osmosis membrane 9. The reverse osmosis membrane 9 is hollow and cylindrical. A hollow portion of the reverse osmosis membrane 9 is used as a purified water channel. The purified water deeply filtered by the reverse osmosis membrane 9 flows out along the purified water channel, and then flows out along the pipeline (direction C in FIG. 8). It is noted that the PP melt-blown filter layer 7 and the sintered activated carbon rod 8 can be replaced with other primary coarse filter materials. In this embodiment, the water purification method adopts the reverse osmosis water purification process. In the embodiment, other water purification processes can be used, such as ultrafiltration, nano-filtration, and ion exchange. The reverse osmosis membrane 9 can be replaced with other deep filtration layer.

The filter element 6 also includes an upper end cover 10 and a lower end cover 11. The PP melt-blown filter layer 7 and the sintered activated carbon rod 8 are both connected to the upper end cover 10 and the lower end cover 11. Both the upper end cover 10 and the lower end cover 11 are provided with grooves capable of fixing the reverse osmosis membrane 9, respectively. The upper end cover 10 is further provided with a plug-in portion adapted to the reverse osmosis membrane 9. The plug-in portion cooperates with a respective groove to fix the reverse osmosis membrane 9 to improve structural integrity and stability of the filter element 6. When the filter element 6 needs to be replaced, the filter element 6 may be taken out of the filter bottle 5 via the upper end cover 10, the PP melt-blown filter layer 7 for primary filtration and the sintered activated carbon rod 8 may be selectively replaced. At this time, the lower end cover 11 may be removed to take out the reverse osmosis membrane 9. After replacement, the reverse osmosis membrane 9 is placed into the sintered activated carbon rod 8 again. The reverse osmosis membrane 9 is fixed through the plug-in portion, and with the bottom of the reverse osmosis membrane 9 being inserted into the groove of the lower end cover 11. The fixed filter element 6 is put into the filter bottle 5. Furthermore, the water inlet channel, the water flow channel and the purified water channel are provided with sealing rings to avoid leakage and improve sealing performance of the water purifier.

More specifically, the composite filter core 4 further includes an upper cover 12 detachably connected to the filter bottle 5. In this embodiment, the upper cover 12 is threadedly connected to the filter bottle 5, the threaded connection is fastened and convenient to disassemble and assemble, thereby facilitating replacement and maintenance of the filter element 6 by an operator.

In this embodiment, the filter assembly 3 further includes a rear filter core 13. A purified water outlet of the composite filter core 4 is communicated with the rear filter core 13, and the purified water filtered by the composite filter core 4 enters the rear filter core 13 for further filtration so as to improve water purification effect.

In other embodiments of the present disclosure, there are multiple rear filter cores 13 which are arranged in series, and the inlet water is filtered layer by layer to further enhance the purification effect. In actual operation, whether to arrange the rear filter core or the number of the rear filter cores can be determined, based on user's standards and quality of the inlet water. The rear filter core 13 may be an activated carbon filter core, a PP melt-blown filter element, a mineralized filter core, a weak base filter core, an energy filter core, a far infrared filter core, a ceramic filter core, and the like.

Further, when the main unit 1 is connected with the expansion unit 2, the expansion unit 2 is arranged between the PP melt-blown filter layer 7 and the sintered activated carbon rod 8. After the inlet water passes through the PP melt-blown filter layer 7, the water flows along the D and E directions, and is pressurized by the booster pump 14 to enter a subsequent filter unit so as to reduce the restrictions on the inlet water pressure and improve flexibility and adaptability of the water purifier. The expansion unit 2 also includes a low pressure switch 15 and a water inlet solenoid valve 16. The low pressure switch 1 and the water inlet solenoid valve 16 are connected to the booster pump 14. The low pressure switch 15 is located near the PP melt-blown filter layer 7, the booster pump 14 is located near the sintered activated carbon rod 8, and the water inlet solenoid valve 16 is located between the low pressure switch 15 and the booster pump 14. After the expansion unit 2 is installed, the water purification process is changed. The water purifier is transferred to an electric drive water purifier. In addition to the booster pump 14, the low pressure switch 15 and the water inlet solenoid valve 16 are further provided to ensure normal operation of the electric drive water purifier. After the inlet water flows out of the PP melt-blown filter layer 7, it passes through the low pressure switch 15 and the water inlet solenoid valve 16, and is pressurized by the booster pump 14 to flow into the sintered activated carbon rod 8 and the reverse osmosis membrane 9 for further filtration. At the same time, a concentrated water solenoid valve 17 is connected to the reverse osmosis membrane 9, and the filtered concentrated water can be discharged through the concentrated water solenoid valve 17 (along the direction B in FIG. 8). A main function of the concentrated water solenoid valve 17 is to open or close the water path through the on-off of the circuit, so as to achieve flushing function of the reverse osmosis membrane 9 (in this embodiment, as an example, the filter assembly 3 is configured as a reverse osmosis filtration mode). The concentrated water solenoid valve 17 used is different from the conventional solenoid valve, which is a special solenoid valve for reverse osmosis concentrated water and has a through hole inside. When the concentrated water solenoid valve 17 is closed, some water still passes it, with a function of a concentrated water proportional device required for normal operation of reverse osmosis. It is noted that when the main unit 1 is used alone, the concentrated water solenoid valve 17 has no electric drive. At this time, the concentrated water solenoid valve 17 is used as a concentrated water proportioner to ensure normal movement of the system. When the main unit 1 and the expansion unit 2 are connected, the concentrated water solenoid valve 17 can not only fulfill a role of the concentrated water proportioner, but also control flushing and prolong the service life of the reverse osmosis membrane 9.

Furthermore, the main unit 1 further includes a four-side valve 18, which is arranged between the faucet 25 and the filter assembly 3, and a check valve 19 is also arranged between an outlet of the filter assembly 3 and the four-side valve 18. The function of the four-side valve 18 is to cut off the raw water supply through its internal mechanical structure when the pressure in the purified water pipeline reaches a certain pressure, so as to achieve effect of stopping when the water is full.

Furthermore, the main unit 1 includes a reserved connector 20 and a pipe plug 21, and the pipe plug 21 is detachably connected to the reserved connector 20. The expansion unit 2 includes a switching plug 22 that is adapted to the reserved connector 20. When the main unit 1 is connected to the expansion unit 2, the reserved connector 20 is connected with the switching plug 22. When the main unit 1 is operated independently, the pipe plug 21 blocks the reserved connector 20. When the main unit 1 is connected with the expansion unit 2, the pipe plug 21 is removed; the reserved connector 20 is connected to the switching plug 22 to change flow direction of the pipeline. Sealing elements are arranged between the reserved connector 20 and the pipe plug 21 and between the reserved connector 20 and the switching plug 22 respectively to avoid leakage. In actual operation, a sealing element may be arranged at the reserved connector 20, which may be used for sealing under two conditions, saving cost. It is noted that when the main unit 1 is connected to the expansion unit 2, the reserved connector 20 and the switching plug 22 may be connected in a plug-in connection manner, which is convenient and quick to disassemble and assemble.

The household water purifier of the present disclosure includes the main unit 1 and the expansion unit 2. The main unit 1 can be used as a non-electric drive water purifier alone. The filter element 6 is of split structure, which is convenient to replace a filter core at a certain stage separately and saves use cost. When the main unit 1 is used independently, the inlet water passes through the PP melt-blown filter layer 7 for preliminary filtration, then directly flows into the sintered activated carbon rod 8, passes through the reverse osmosis membrane 9, in turn passes through a plurality of rear filter element 13 in sequence, and is purified to pass through the check valve 19 and the four-side valve 18, and finally is discharged through the faucet 25. The main unit 1 is detachably connected to the expansion unit 2. When the main unit 1 is connected to the expansion unit 2, the water flow is cut off after passing through the PP melt-blown filter layer 7, and the water flow flows along the D and E pipelines to complete a return flow. In addition, before the main unit 1 is connected to the expansion unit 2, the purified water outlet of the four-side valve 18 is directly connected to the faucet 25. After the main unit 1 is connected to the expansion unit 2, the purified water outlet of the four-side valve 18 flows along the G pipeline, through a high pressure switch 23, and then flows into the faucet 25 along the F pipeline. It is noted that the expansion unit 2 includes a controller 24. The concentrated water solenoid valve 17, the booster pump 14, the water inlet solenoid valve 16, the low pressure switch 15, the high pressure switch 23 and the four-side valve 18 are all connected to the controller 24 for controlling working states of each component. Since arrangement of the controller 24 belongs to conventional technical means for those skilled in the art, it will not be further described here.

In the household water purifier of the present disclosure, the filter element 6 is located in the filter bottle 5. During use, when the filter element 6 needs to be replaced, the filter element 6 can be directly taken out of the filter bottle 5 for replacement. The filter element 6 is of a split structure, it is no necessary for the filter element 6 to be replaced as a whole, and only some failed components of the filter element 6 are replaced, which further improves convenience of replacement and maintenance of the water purifier filter element, and saves maintenance costs and use costs of the water purifier. Furthermore, the expansion unit 2 is provided in the present disclosure, and the water purifier can be operated in two working modes: a non-electric drive mode and an electric drive mode, which improves adaptability and convenience of the water purifier.

In the present disclosure, specific examples are used to illustrate the principles and implementation of the present disclosure. The description of the above examples is only used to help understand the method and core idea of the present disclosure; at the same time, for those of ordinary skill in the art, according to this The idea of the disclosure will change in the specific implementation and the scope of application. In summary, the content of this specification should not be construed as a limitation to the present disclosure.

What is claimed is:

1. A household water purifier, comprising a main unit and a filter assembly arranged in the main unit, wherein the filter assembly comprises a composite filter core;

the composite filter core comprises a filter bottle and a filter element, the filter element is arranged in the filter bottle, and the filter element is of a separated structure, wherein the filter element comprises a polypropylene (PP) melt-blown filter layer, a sintered activated carbon rod and a reverse osmosis membrane, and the PP melt-blown filter layer is sleeved on the sintered activated carbon rod, a first gap formed between the PP melt-blown filter layer and the filter bottle is configured as a water inlet channel, and the sintered activated carbon rod is sleeved on the reverse osmosis membrane, and a second gap formed between the sintered activated carbon rod and the reverse osmosis membrane is configured as a water flow channel; the reverse osmosis membrane is hollow and cylindrical, a hollow portion of the reverse osmosis membrane is configured as a purified water channel; and an expansion unit detachably connected to the main unit, wherein the expansion unit comprises a booster pump for pressurizing a water path, wherein when the main unit is not connected to the expansion unit, the household water purifier is operable without being driven by electric power; and when the main unit is connected to the expansion unit, the expansion unit is arranged between the PP melt-blown filter layer and the sintered activated carbon rod, the booster pump pressurizes the water path to enable the household water purifier to operate by electric power;

wherein the expansion unit further comprises a low pressure switch and a water inlet solenoid valve; the low pressure switch and the water inlet solenoid valve are connected with the booster pump, the low pressure switch is arranged close to the PP melt-blown filter layer; the booster pump is arranged close to the sintered activated carbon rod; the water inlet solenoid valve is located between the low pressure switch and the booster pump, such that an inlet water flows out of the PP melt-blown filter layer, passes through the low pressure switch and the water inlet solenoid valve, and is pressurized by the booster pump to flow into the sintered activated carbon rod and the reverse osmosis membrane; the reverse osmosis membrane is connected with a concentrated water solenoid valve;

wherein the main unit comprises a reserved connector and a pipe plug, and the pipe plug is detachably connected to the reserved connector; the expansion unit comprises a switching plug fitted into the reserved connector; when the main unit is connected to the expansion unit, the reserved connector is connected to the switching plug; sealing elements are arranged between the reserved connector and the pipe plug as well as between the reserved connector and the switching plug, respectively.

2. The household water purifier according to claim 1, wherein the filter element further comprises an upper end cover and a lower end cover, the PP melt-blown filter layer and the sintered activated carbon rod are connected with the upper end cover and the lower end cover, the upper end cover and the lower end cover each have a groove capable of fixing the reverse osmosis membrane, and the upper end cover further has a plug-in portion fitted with the reverse osmosis membrane; the water inlet channel, the water flow channel and the purified water channel are provided with sealing rings, respectively.

3. The household water purifier according to claim 1, wherein the composite filter core further comprises an upper cover, and the upper cover is detachably connected to the filter bottle.

4. The household water purifier according to claim 1, wherein the filter assembly further comprises a rear filter core, and a purified water outlet of the composite filter core is in communication with the rear filter core.

5. The household water purifier according to claim 4, wherein a plurality of rear filter cores are provided, and arranged in series.

6. The household water purifier according to claim 1, wherein the main unit further comprises a four-side valve arranged between a faucet and the filter assembly, and a check valve is arranged between a water outlet of the filter assembly and the four-side valve.

* * * * *